United States Patent [19]

Goossens et al.

[11] Patent Number: 5,744,526
[45] Date of Patent: Apr. 28, 1998

[54] COLOR AND HYDROLYTIC STABILIZATION OF AROMATIC POLYCARBONATE RESINS

[75] Inventors: Johanes M.D. Goossens; Theodours L. Hoeks, both of Bergen Op Zoom, Netherlands

[73] Assignee: General Electric Company, Pittsfield, Mass.

[21] Appl. No.: 855,913

[22] Filed: May 14, 1997

[51] Int. Cl.$^6$ .................. C08K 5/526; C08K 5/5393; C08K 5/50

[52] U.S. Cl. .................. 524/90; 524/126; 524/151; 524/153; 524/154

[58] Field of Search .................. 524/151, 153, 524/126, 127, 154, 252, 90, 91

[56] References Cited

U.S. PATENT DOCUMENTS

| | | | |
|---|---|---|---|
| 2,964,493 | 12/1960 | Hakala et al. | 524/89 |
| 3,239,485 | 3/1966 | Koch | 524/89 |
| 3,320,200 | 5/1967 | Kane | 524/89 |
| 3,553,298 | 1/1971 | Hodan et al. | 524/252 |
| 3,654,212 | 4/1972 | Wright | 524/252 |
| 3,673,146 | 6/1972 | Factor . | |
| 3,692,730 | 9/1972 | Sims | 524/252 |
| 4,358,563 | 11/1982 | Quinn et al. . | |
| 4,381,358 | 4/1983 | Rosenquist . | |
| 5,280,060 | 1/1994 | Abe et al. | 524/90 |
| 5,468,895 | 11/1995 | Mahood | 524/252 |
| 5,514,742 | 5/1996 | Gardner et al. | 524/252 |
| 5,605,947 | 2/1997 | Mahood | 524/252 |
| 5,674,927 | 10/1997 | Mahood | 524/252 |

Primary Examiner—Veronica P. Hoke

[57] ABSTRACT

An aromatic polycarbonate composition having improved color stability and improved hydrolytic stability, while maintaining good processing properties, which composition consists of an aromatic polycarbonate and a stabilizer system consisting of at least one organic phosphorous containing additive and hexamethylene tetra amine.

18 Claims, No Drawings

COLOR AND HYDROLYTIC STABILIZATION OF AROMATIC POLYCARBONATE RESINS

FIELD OF THE INVENTION

The present invention is directed to a thermoplastic aromatic polycarbonate composition having improved color stabilization and improved hydrolytic stability, while maintaining good processibility properties. More specifically the composition of this invention comprises in combination an aromatic polycarbonate resin and a stabilizing system comprising at least one phosphorus containing additive and a particular amine additive in an amount sufficient to provide color and hydrolytic stabilization to the polycarbonate composition, while maintaining good processibility properties.

BACKGROUND OF THE INVENTION

Clear transparent or even translucent aromatic polycarbonate resins upon exposure to an additional heat phase such as injection molding, extrusion or compounding thereof, will induce yellowing of the polycarbonate resin. Even with phosphite stabilizers, yellowing of the polycarbonate and hydrolysis of the phosphite can occur particularly at processing temperatures. It is believed that the phosphites being susceptible toward hydrolysis at elevated or processing temperatures form in-situ acid species which can then react with the polycarbonate possibly increasing chain scission and giving rise to side-reactions which can eventually generate color in the molded article. This can also occur during extrusion, compounding or molding of the polycarbonate resin.

The addition of additives to polycarbonate compositions to achieve certain properties or improved properties has been known to affect processibility of the polycarbonate resin during extrusion, compounding or injection molding of the polycarbonate composition. Therefore, the additive or additives employed to achieve better properties should not affect processibility. It has also been known to stabilize polycarbonate resin against discoloration by employing phosphites and/or epoxies as stabilizing additives. These are broadly disclosed in such U.S. Pat. Nos. 4,381,358, 4,358,563 and 3,673,146.

SUMMARY OF THE INVENTION

This invention is directed to polycarbonate composition having improved color and hydrolysis stabilization wherein the polycarbonate is stabilized with a stabilizing amount of composition comprising at least one phosphorous containing additive which may be either a phosphite, phosphate or phosphonite and a particular amine additive. This invention is also directed to a process for preparing an article made from a polycarbonate composition having improved color stability and improved resistance to hydrolysis of the phosphite, while maintaining good processing properties including plate out. The polycarbonate composition may be either injection molded, extruded into sheet or film, profile extruded, co-extruded or extruded blow molded.

The phosphorous containing additive employed herein may be either a single phosphorous containing additive or a combination of two or more phosphorous compounds. The phosphorous containing additive that may be employed herein are any of the organic phosphorous additives having at least about 6 carbons and preferably about 6 to about 50 carbons. Preferred additives are tris (2,4-di-tertiary butyl phenyl) phosphite, tris (nonylphenyl) phosphite, triphenylphosphite, decyl diphenyl phosphite, didecyl phenyl phosphite, tridecyl phosphite, tris (1,4 di-tertiary butylphenyl) phosphite, tris iso-decyl phosphite, bis(2,4 di-tertiary-butylphenyl) pentaerythritol bisphosphite, distearoyl pentaerythritol bisphosphite, bis(2-tertiary-butyl-4-cumylphenyl) pentaerythritol bisphosphite, 2,2'-methylene bis(4,6-di-tertiary-butylphenyl) octylphosphite, bis(2,6-di-tertiary-butyl-4-methylphenyl) pentaerythritol bisphosphite, 2,4,6-tri-tertiary-butylphenyl 2-butyl 2-ethyl 1,3-propane diol phosphite, bis(2,2-dimethyl-1,3-propanediol) tetra[2,2,-bis(4-hydroxy 3,5-di-tertiary-btuylphenyl) propane bisphosphite, bis (2,4 dicumylphenyl) pentaerythritol bisphosphite or mixtures thereof. The preferred phosphorous additive employed in the practice of this invention may be either tris (2,4-di-tertiary-butylphenyl phosphite), 2,4,6 tri-tertiary-butylphenyl 2-butyl 2 ethyl, 1,3 propane diol phosphate or bis (2-tertiary butyl 1,4 cumylphenyl) pentaerythritol diphosphite, or mixture thereof. Other phosphorous containing additives which can be used as color stabilizers in the practice of this invention are triphenyl phosphite and tetrakis (2,4,di-tertiary butyl phenyl) $1,1^1$ biphenyl $4,4^1$ diphosphonite.

It has now been discovered that a particular amine employed with the phosphorous additive provides significant improvement in color stability upon processing of the composition as well as improved hydrolytic stability of the aromatic polycarbonate composition without substantially effecting the processibility, properties and plate out of the polycarbonate composition. Plate out is where additives to the composition migrate to the surface of the finished article or become deposited on the surface of the mold or on the surface of the rolls employed in extruding sheet or on the surface of a calibrator employed in profile extrusion. The particular amine employed in the practice of this invention in combination with the phosphorous additive is hexamethylene tetra amine. (HMTA). The amount employed with the phosphite is that amount sufficient to achieve color stability, i.e. improved resistance to yellowing and improved hydrolytic stability. Preferably the amount of HMTA employed is about 0.5 to about 2.0 weight percent cased on the total weight of phosphorous containing additive and HMTA.

The amount of total stabilizer employed herein, i.e. phosphite, phosphine or phosphonite and HMTA, should be that amount sufficient to stabilize the aromatic polycarbonate resin against discoloration and improve hydrolytic stability, while maintaining good processibility properties such as plate out during extrusion, compounding or molding. Preferably, the stabilizer comprises about 0.01 weight % to about 0.30 weight % based on the total weight of the polycarbonate component of the composition. Particularly the range of stabilizer composition is about 0.02 to about 0.10 weight % and more particularly the range of total stability is about 0.02 to about 0.05 weight % thereof.

While a single phosphorous additive in combination with the HMTA is applicable in this invention, a preferred combination of phosphorous additives may also be desirable. When employing two phosphorous materials, the phosphorous additive system preferably comprises about 10–90 weight % of one phosphorous additive and about 90–10 weight % of another particular phosphorous additive based on the total weight of the phosphite part of the stabilizer composition employed.

The aromatic polycarbonate resin employed herein may be any of the known aromatic polycarbonates, co-polycarbonates, or blends of polycarbonates with other polymers or co-polycarbonates. The aromatic polycarbonate employed in the practice of this invention may be prepared by reacting a dihydric phenol with a carbonate precursor in the presence of an acid acceptor and generally a molecular weight regulator. Any dihydric phenol may be employed in preparing the polycarbonate resin disclosed herein. Preferably, they are mononuclear or polynuclear aromatic compounds containing as functional groups two hydroxyl radicals, each of which is attached directly to a carbon atom of an aromatic nucleus. Examples of some of the dihydric phenols which can be employed in the practice of this invention are bisphenols such as 1,1-bis (4-hydroxyphenyl) methane, 2,2-bis(4-hydroxyphenyl) propane, 4,4-bis(4-hydroxyphenyl) heptane, etc.; dihydric phenol ethers such as bis(4-hydroxyphenyl ether, bis(3,5-dichloro-4-hydroxyphenyl) ether, etc.; dihydroxy diphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, bis (3-methyl-5-ethyl-4-hydroxyphenyl) sulfone, etc.; dihydroxy benzenes, resorcinol, hydroquinone; halo- and alkyl-substituted dihydroxy benzenes such as 1,4-dihydroxy-2-chlorobenzene, 1,4-dihydroxy-2,3-dichlorobenzene, 1,4-dihydroxy-2-methylbenzene, etc.; and dihydroxy diphenyl sulfoxides such as bis(4-hydroxyphenyl) sulfoxide, bis(3,5-dibromo-4-hydroxyphenyl) sulfoxide, etc.

The carbonate precursor employed in the practice of this invention can be either carbonyl halide or a haloformate. The carbonyl halides which can be employed herein are carbonyl bromide, carbonyl chloride, carbonylfluoride, etc.; or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc). While other carbonate precursors will occur to those skilled in the art, carbonyl chloride, also known as phosgene, is preferred.

The reaction disclosed above is preferably known as an interfacial process or reaction between the dihydric compound and a carbonyl chloride such as phosgene. Another process for preparing the aromatic polycarbonate of this invention is the transesterification process which involves the transesterification of an aromatic dihydroxy compound and a diester carbonate. This process is known as the melt process. In the practice of this invention, the process of producing the aromatic polycarbonate is not critical. The critical feature of this invention is the composition of the aromatic polycarbonate and the stabilizer system. As used herein, aromatic polycarbonate shall mean and include any of the aromatic polycarbonates and combinations thereof as set forth above.

The polycarbonate composition of the invention may also include such other additives or UV stabilizers, release agents, fillers and reinforcing fillers such as glass fibers (short or long glass fibers), carbon fibers, talc, silica and other known additives employed in polycarbonate compositions.

The composition of this invention comprises in combination an aromatic polycarbonate and a stabilizing composition comprising at least one organic phosphorous containing additive such as phosphite, phosphine or phosphonite and hexamethylene tetra amine which stabilizing composition is present in an amount sufficient to improve the polycarbonate composition against color degradation in the article formed from the composition of this invention. In addition, the composition of this invention compromises an aromatic polycarbonate composition having improved color stabilizations and having in combination a color stabilizing composition consisting essentially of at least one phosphorous additive and hexamethylene tetra amine in an amount sufficient to improve color and hydrolytic stability of the polycarbonate composition. Preferably, the composition comprises about 99.7 to about 99.99 weight & of the aromatic polycarbonate and about 0.30 to about 0.01 weight % of the stabilizer composition, the weight percents being based on the weight of the polycarbonate resin composition, i.e. polycarbonate and stabilizer composition.

As stated previously, the stabilizer system disclosed herein stabilizes the polycarbonate against yellowing during heat processing of the composition, as well as improving resistance to hydrolysis of the phosphite at processing temperatures without significantly affecting the processability and physical properties of the composition including plate out. Processability with respect to extrusion can be that extrusion or compounding during preparation of the composition for subsequent molding or extrusion or co-extrusion into sheet or film, or extrusion blow molding or profile extrusion. Such processes are well known to those skilled in the art and are disclosed in numerous articles and patents. Preferably, the composition is first compounded, generally, in an extruder and extruded into strands which are generally quenched, pelletized, dried and processed under further heat and pressure into the finished article. The finished article may be injection molded, profile extruded, sheet or film extruded, co-extruded or extruded blow molded into hollow shapes such as single or multi-layer plastic bottles. The key feature of the invention is that the composition has improved color stability and improved resistance to the hydrolysis, while maintaining good processing and physical properties.

DETAILED DESCRIPTION OF THE EXAMPLES OF THIS INVENTION

This invention can be further described by means of the following Examples; it being understood, however, that this invention shall in no way be restricted by these Examples. In the Examples where amounts are in terms of percent, they are percent by weight.

The test procedures employed were as follows:

Melt Volume Index (MVI)—determined in accordance with ISO 1133 which is the same as ASTM D-1238

Yellowness Index (YI)—determined in accordance with ASTM D-1925-63T

Δ YI—the difference between formulation A (benchmark) and formulations B, C, D and E respectively Haze—same test procedure employed for YI, namely ASTM D-1925-63T/ASTM D-1003

Formulations:
 A—99.95 weight % polycarbonate plus UV-absorber and release agent 0.05 weight % tris(2,4-di tertiary butylphenyl phosphite)
 B1—99.97 weight % polycarbonate plus UV-absorber and release agent 0.0297 weight % tris(2,4-di tertiary butylphenyl phosphite) 0.0003 weight % hexamethylene tetra amine (HMTA)
 B2—99.95 weight % polycarbonate plus UV-absorber and release agent 0.0495 weight % tris(2,4-di tertiary butylphenyl phosphite) 0.0005 weight % hexamethylene tetra amine (HMTA)
 C—99.96 weight % polycarbonate plus UV-absorber and release agent 0.04 weight % 2,4,6 tri-tertiary-butylphenyl 2 ethyl 1,3 propane diol phosphite
 D1—99.98 weight % polycarbonate plus UV-absorber and release agent 0.0198 weight % 2,4,6 tri-tertiarybutylphenyl 2 ethyl 1,3 propane diol phosphite 0.0002 weight % hexamethylene tetra amine (HMTA)

D2—99.96 weight % polycarbonate plus UV-absorber and release agent 0.0396 weight % 2,4,6 tri-tertiary-butylphenyl 2 ethyl, 1,3 propane diol phosphite 0.0004 weight % hexamethylene tetra amine (HMTA)

E—99.97 weight % polycarbonate plus UV-absorber and release agent 0.0297 weight % bis-(2tertiary butyl-4-cumphenyl)-pentaerythritol diphosphite 0.0003 weight % hexamethylene tetra amine (HMTA)

Note: For formulations B1, B2, D1, D2 and E, the HMTA load is about 1 weight % of the phosphite load.

EXAMPLE 1

Polycarbonate powder, having an intrinsic viscosity of about 0.48 deciliters/gram (dl/g) as measured at 20° C. in methylene chloride and additives as set forth in the following Table 1 were compounded in an extruder and extruded into strands at a melt temperature in the extruder of about 310° C. Each formulation contained essentially the same quantity of polycarbonate being varied only with respect to the quantity of stabilizer employed in each formulation. The same weight % of UV absorber and mold release agent was employed in each formulation and was about 0.2 weight % of the total formulation. The extruded strands were quickly quenched in water and pelletized. Half the pellets obtained were dried at about 120° C. for about 2 hours and were passed through the extruder again under the same extrusion conditions.

Melt Volume index was determined for each formulation both after single and double pass through the extruder. The results obtained were the average of two (2) samples for each formulation and were as follows in TABLE 1.

TABLE 1

| | MVI (300° C./1.2 kg.) | |
|---|---|---|
| Formulation | Single Pass Extrusion (cm³/10 min) | Double Pass Extrusion (cm³/10 min) |
| A | 7.0 | 6.7 |
| B-1 | 5.3 | 5.3 |
| B-2 | 4.8 | 4.8 |
| C | 4.8 | 4.9 |
| D-1 | 5.1 | 5.0 |
| D-2 | 4.8 | 4.9 |
| E | 4.8 | 4.7 |

As shown in Table 1, the processibility flow of the compositions were not essentially effected by the addition of about 1 weight % of HMTA based on the weight of the phosphite employed therein.

Of all formulations, both once and twice passed through the extruder, dried pellets were injection molded into clear plaques about 10 cm square by 2.5 mm thick at about 300° C., at residence time of about 165 seconds and molding cycle of about 39 seconds.

EXAMPLE 2

Pellets of all formulations of Example 1 that were passed through the extruder once were injection molded under abusive conditions. The conditions of abusive molding consisted of molding at about 330° C., residence time of about 680 seconds and a cycle time of about 158 seconds.

All molded plaques of Example 1 and the Example were measured for Yellowness Index at a thickness of 2.5 mm. For the three conditions of molding as set forth in TABLE 2 under which plaques were produced, the Yellowness Index results were compared with the results obtained from formulation A. The results were reported as delta values (Δ) in TABLE 2 below.

TABLE 2

| | ΔYI | | |
|---|---|---|---|
| Formulation | Condition 1 Single Pass Extrusion Followed By Molding | Condition 2 Double Pass Extrusion Followed By Molding | Condition 3 Single Pass Extrusion Followed By Abusive Molding |
| A (benchmark) | 0 | 0 | 0 |
| B1 | −0.2 | −0.9 | −1.0 |
| B2 | −0.5 | −1.2 | −2.0 |
| C | −0.3 | −0.9 | −2.1 |
| D1 | −0.3 | −0.7 | −1.8 |
| D2 | −0.8 | −1.3 | −2.3 |
| E | −0.7 | −1.5 | −2.3 |

As shown in TABLE 2, addition of 1 weight % of HMTA to the applied phosphate results in a better color stability. The positive influence of HMTA is even observed at a reduced phosphite load. The greater the negative Δ YI, the better the color stability.

Each of the samples had better color stability than the benchmark sample A in all three test conditions.

EXAMPLE 3

Example 1 and Example 2 were repeated except that the sample molded plaques of each formulation were determined for haze by autoclaving at 120° C. for up to 230 hours. The results obtained were the average of four (4) samples for each formulation and are set forth in TABLE 3 below:

TABLE 3

| | Haze after 0/50 and 230 hours autoclaving | | | | | | | | |
|---|---|---|---|---|---|---|---|---|---|
| | Single Pass Extrusion Followed By Molding | | | Double Pass Extrusion Followed By Molding | | | Single Pass Extrusion Followed By Abusive Molding | | |
| Formulation | 0 | 50 | 230 | 0 | 50 | 230 | 0 | 50 | 230 |
| A | 0.5 | 1.1 | 1.9 | 1.3 | 2.7 | 4.3 | 0.5 | 1.3 | 2.4 |
| B1 | 0.5 | 1.0 | 1.9 | 0.7 | 1.4 | 2.5 | 0.8 | 1.6 | 2.3 |
| B2 | 0.5 | 0.8 | 1.5 | 0.6 | 1.3 | 2.2 | 0.5 | 0.8 | 1.7 |
| C | 0.4 | 0.6 | 2.0 | 0.7 | 1.0 | 1.8 | 0.7 | 3.5 | 3.3 |
| D1 | 0.4 | 0.8 | 1.9 | 0.8 | 1.8 | 2.2 | 0.5 | 3.0 | 1.8 |
| D2 | 0.3 | 0.8 | 2.0 | 1.1 | 1.9 | 2.8 | 0.5 | 0.8 | 1.6 |
| E | 0.5 | 0.8 | 3.4 | 0.9 | 1.6 | 2.4 | 0.4 | 0.7 | 1.8 |

In addition to haze measurements, molecular weight (Mw) prior to and after 230 hours of autoclaving was measured. This however was only done for molded samples extruded once. The results obtained were the average of (4) samples for each formulation and are set forth on TABLE 4.

TABLE 4

| Formulation | Mw before Autoclaving | Mw drop after 230 hours of autoclaving |
| --- | --- | --- |
| A | 28710 | 11.3% |
| B1 | 29900 | 8.3% |
| B2 | 30750 | 9.1% |
| C | 30670 | 40.3% |
| D1 | 30430 | 23.1% |
| D2 | 30780 | 39.7% |
| E | 30820 | 42.1% |

Mw—Weight average molecular weight determined by means of Gel Permeation Chromatograph (GPC).

As shown in TABLE 3 for all plaques from each formulation no significant increase in haze was measured due to 230 hours of autoclaving. This indicates good hydrolytic stability is obtained with all tested formulations.

Results obtained by measuring the Mw. as shown in TABLE 4, disclose the hydrolytic stability of the tested formulations more into detail. First of all it can be concluded that addition of HMTA to the phosphite improves the retention of Mw after 230 hours of autoclaving, indicating improved hydrolytic stability. Also it can be concluded that the Mw drop due to autoclaving is depending on the type and load of phosphite used. A lower phosphite load (formulation B1 and D1) results in increased color stability.

EXAMPLE 4

Sample molded plaques from Example 1 and Example 2 were analyzed for yellowness index after heat aging the samples at 130° C. for 4 weeks. The results obtained were the average of four (4) samples for each formulation and are set forth in TABLE 5.

TABLE 5

| | Yellowness index prior to and after 4 weeks heat aging | | | | | |
| --- | --- | --- | --- | --- | --- | --- |
| | Single Pass Extrusion Followed By Molding | | Double Pass Extrusion Followed By Molding | | Single Pass Extrusion Followed By Abusive Molding | |
| Formulation | 0 weeks | 4 weeks | 0 weeks | 4 weeks | 0 weeks | 4 weeks |
| A | 1.0 | 5.7 | 2.75 | 7.4 | 2.7 | 7.8 |
| B1 | 0.85 | 4.7 | 1.9 | 5.75 | 1.8 | 6.1 |
| B2 | 0.5 | 3.0 | 1.6 | 4.25 | 0.8 | 3.3 |
| C | 0.7 | 2.15 | 1.9 | 3.8 | 0.7 | 2.9 |
| D1 | 0.7 | 2.9 | 2.1 | 4.65 | 1.0 | 3.4 |
| D2 | 0.25 | 1.7 | 1.5 | 3.4 | 0.5 | 1.9 |
| E | 0.35 | 2.65 | 1.3 | 3.8 | 0.5 | 3.9 |

As shown from the results above, formulations containing HMTA and phosphite had a better color stability after heat aging over formulations without HMTA. Also color stability is dependent on the type and load of phosphite used. A lower phosphite load (formulation B1 and D1) results in decreased color stability.

EXAMPLE 5

Plate-out was analyzed by profile extrusion of formulations A and B2 at conventional profile extrusion conditions. Both formulations showed essentially equal performance with respect to plate-out. The slight depositions on the calibrator showed no presence of reaction products which could be traced back to origination from hexamethylene tetra-amine.

As can be seen from the Examples, a polycarbonate composition employing the stabilizer system of this invention, i.e. a phosphite and HMTA has better color and hydrolytic stability without significantly effecting processibility and plate out of the composition than a stabilizer with only a phosphite.

What is claimed is:

1. An aromatic polycarbonate composition having improved color and hydrolytic stability, while maintaining good processing properties, wherein the aromatic polycarbonate composition comprises an aromatic polycarbonate and a stabilizer composition comprising in a combination (a) at least one organic phosphorous containing additive selected from the group consisting of phosphite, phosphine and phosphonite and (b) hexamethylene tetra amine, said stabilizer being present in an amount sufficient to provide an aromatic polycarbonate composition having improved color and hydrolytic stability.

2. The composition of claim 1 wherein the stabilizer composition comprises at least two chemically different organic phosphorous containing additives.

3. The composition of claim 1 wherein the stabilizer composition comprises about 0.01 to about 0.30 weight % based on the weight of the polycarbonate and stabilizer composition.

4. The stabilizer composition of claim 3 wherein the stabilizer composition comprises about 0.02 to about 0.10 weight %.

5. The stabilizer composition of claim 3 wherein the stabilizer composition comprises about 0.02 to about 0.05 weight %.

6. The composition of claim 1 wherein the stabilizer composition comprises about 0.5 weight % to about 2.0 weight % of hexamethylene tetra amine and about 99.5 weight % to about 98.0 weight % of the phosphorous containing additive based on the total weight of the stabilizer composition.

7. The composition of claim 6 wherein the stabilizer composition comprises about 0.5 weight % to about 1.0 weight % of the hexamethylene tetra amine.

8. The compositions of claim 1 wherein the phosphorous containing additive is a phosphite.

9. The composition of claim 8 wherein the phosphite is tris(2,4-di-tertiary butylphenyl) phosphite.

10. An aromatic polycarbonate composition having improved color hydrolytic stability and, while maintaining good processing properties, comprising in combination an aromatic polycarbonate and a stabilizer composition consisting essentially of (a) at least one organic phosphorous containing additive selected from the group consisting of phosphite, phosphine and phosphonite and (b) hexamethylene tetra amine, said stabilizer composition being present in an amount sufficient to provide a polycarbonate composition having improved color and hydrolytic stability.

11. The composition of claim 10 wherein the stabilizer composition consists essentially of about 0.01 to about 0.03 weight % based on the weight of the polycarbonate and stabilizer composition.

12. The composition of claim 10 wherein the stabilizer composition consists essentially of about 0.5 weight % to about 2.0 weight % of hexamethylene tetra amine and about 99.5 weight % to about 98.0 weight % of the phosphorous containing additive.

13. A process of preparing a thermoplastic article from an aromatic polycarbonate composition wherein the thermoplastic article has improved color hydrolytic stability and while maintaining good processing properties said process comprising the steps of extruding an aromatic polycarbonate composition, pelletizing the extruded polycarbonate composition and then forming the finished article under heat and pressure, said polycarbonate composition comprising about 99.99 to about 99.70 weight % of an aromatic polycarbonate and about 0.01 to about 0.03 weight % of a stabilizer composition comprising of (a) at least one organic phosphorous containing additive selected from the group consisting of phosphite, phosphine and phosphonite and (b) hexamethylene tetra amine based on the weight of the polycarbonate and stabilizer.

14. The process of claim 12 wherein the stabilizer composition consists essentially of about 0.5 to about 2.0 weight % of hexamethylene tetra amine and about 99.5 to about 98.0 weight % of the phosphorous containing additive.

15. The process of claim 12 wherein the thermoplastic article is an injection molded article.

16. The process of claim 12 wherein the thermoplastic article is a clear extruded polycarbonate sheet.

17. The process of claim 12 wherein the thermoplastic article is an extruded profile.

18. A transparent thermoplastic aromatic polycarbonate article having improved color hydrolytic stability and comprising in combination an aromatic polycarbonate and a stabilizer comprising (a) at least one organic phosphorous containing additive selected from the group consisting of phosphite, phosphine, and phosphonite and (b) hexamethylene tetra amine, said stabilizer being present in an amount sufficient to provide an aromatic polycarbonate article having improved color and hydrolytic stability.

* * * * *